US012741558B2

(12) United States Patent
Chae

(10) Patent No.: US 12,741,558 B2
(45) Date of Patent: Sep. 22, 2026

(54) REPLACEMENT BATTERY AND OPERATING METHOD THEREOF

(71) Applicant: LG Energy Solution, Ltd., Seoul (KR)

(72) Inventor: Min Young Chae, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 19/129,801

(22) PCT Filed: Jul. 4, 2023

(86) PCT No.: PCT/KR2023/009445

§ 371 (c)(1),
(2) Date: May 14, 2025

(87) PCT Pub. No.: WO2024/122781

PCT Pub. Date: Jun. 13, 2024

(65) Prior Publication Data

US 2026/0192694 A1 Jul. 9, 2026

(30) Foreign Application Priority Data

Dec. 8, 2022 (KR) ........................ 10-2022-0171005

(51) Int. Cl.

*B60L 53/62* (2019.01)
*B60L 53/80* (2019.01)
*H01M 10/42* (2006.01)
*H01M 50/249* (2021.01)

(52) U.S. Cl.

CPC ............... *B60L 53/62* (2019.02); *B60L 53/80* (2019.02); *H01M 10/425* (2013.01); *H01M 50/249* (2021.01); *B60L 2210/10* (2013.01); *B60L 2210/40* (2013.01); *H01M 2010/4271* (2013.01)

(58) Field of Classification Search

CPC ...... B60L 53/62; B60L 53/80; B60L 2210/10; B60L 2210/40; H01M 50/249; H01M 10/425; H01M 2010/4271

See application file for complete search history.

(56) References Cited

U.S. PATENT DOCUMENTS 11,136,008 B2 * 10/2021 Lai ........................ G01R 31/382
11,351,886 B2 6/2022 Zhao
2012/0183813 A1 7/2012 Kim (Continued)

FOREIGN PATENT DOCUMENTS

EP 4159556 A1 4/2023
GB 2595970 A 12/2021

(Continued)

OTHER PUBLICATIONS

International Search Report for Application No. PCT/KR2023/009445 mailed Oct. 6, 2023. 3 pages.

(Continued)

*Primary Examiner* — Carlos Amaya
(74) *Attorney, Agent, or Firm* — Lerner David LLP

(57) ABSTRACT

A replacement battery is disposed in a slot in a battery swapping station. The replacement battery obtains required voltage data of an external electronic device from the battery swapping station. The replacement battery converts power stored in a battery unit into voltage based on the required voltage data, outputs the voltage to the external electronic device.

13 Claims, 5 Drawing Sheets

(56) References Cited

U.S. PATENT DOCUMENTS

| | | | |
|---|---|---|---|
| 2012/0303397 A1 | | 11/2012 | Prosser |
| 2015/0183332 A1 | | 7/2015 | Yun et al. |
| 2022/0126725 A1 | | 4/2022 | Wang et al. |
| 2022/0227249 A1 | | 7/2022 | Wu |
| 2022/0230111 A1 | * | 7/2022 | Ikui ....................... B60L 53/305 |
| 2022/0289067 A1 | | 9/2022 | Adegbohun |
| 2022/0383402 A1 | * | 12/2022 | Takemura ............... B60L 53/66 |
| 2022/0393491 A1 | | 12/2022 | Zhang et al. |

FOREIGN PATENT DOCUMENTS

| | | | |
|---|---|---|---|
| KR | 20120083850 | A | 7/2012 |
| KR | 101528079 | B1 | 6/2015 |
| KR | 102282338 | B1 | 7/2021 |
| KR | 20220115623 | A | 8/2022 |
| WO | 2021238938 | A1 | 12/2021 |

OTHER PUBLICATIONS

Extended European Search Report including Written Opinion for Application No. 23900803.0 dated Mar. 20, 2026. 19pgs.

* cited by examiner

REPLACEMENT BATTERY AND OPERATING METHOD THEREOF

CROSS-REFERENCE TO RELATED APPLICATION

This application is a national phase entry under 35 U.S.C. § 371 of International Application No. PCT/KR2023/009445, filed on Jul. 4, 2023, which claims priority to and the benefit of Korean Patent Application No. 10-2022-0171005 filed in the Korean Intellectual Property Office on Dec. 8, 2022, the entire contents of which are incorporated herein by reference.

TECHNICAL FIELD

Embodiments disclosed herein relate to a replacement battery and an operating method thereof.

BACKGROUND ART

A battery swapping station is designed to accommodate and manage a plurality of replacement batteries and to allow the plurality of replacement batteries to be easily used by users of electric-powered vehicles such as electric vehicles, electric scooters, electric bicycles, etc. For example, the battery swapping station may charge a replacement battery by using power from an external power supply device and provide the fully charged replacement battery to a user of an electric-powered vehicle.

The user may separate the fully charged replacement battery from the battery swapping station and mount the same on the electric-powered vehicle for use. The user may separate a depleted replacement battery from the electric-powered vehicle and mount the replacement battery on the battery swapping station to charge the replacement battery.

SUMMARY

Technical Problem

For electric-powered vehicles, a required voltage may differ depending on a model. A battery swapping station provides replacement batteries that collectively supply power based on the same voltage. A user may be provided with a replacement battery that supplies power appropriate for an electric-powered vehicle only when the user inputs a required voltage of the electric-powered vehicle to the battery swapping station, making the use thereof cumbersome.

To solve the above-described problem, embodiments disclosed herein may provide a replacement battery which supplies power corresponding to model data when the user of the electric-powered vehicle inputs the model data of the electric-powered vehicle to a user terminal or the battery swapping station, and an operating method of the replacement battery.

Moreover, embodiments disclosed herein may provide a replacement battery which may serve as a mobile power bank as well as a replaceable battery in the electric-powered vehicle, and an operating method of the replacement battery.

Technical problems of the embodiments disclosed herein are not limited to the above-described technical problems, and other unmentioned technical problems would be clearly understood by one of ordinary skill in the art from the following description.

Technical Solution

One aspect of the disclosure is directed to a replacement battery comprising: a battery unit; a communication circuit configured to obtain required voltage data of an external electronic device from a battery swapping station into which the replacement battery is configured to be inserted, wherein the required voltage data is an indication of a required voltage for operation of the external electronic device based on model data of the external electronic device; a power management circuit configured to convert power stored in the battery unit into the required voltage for operation of the external electronic device based on the required voltage data; and an output terminal configured to output the voltage to the external electronic device based on the required voltage data, wherein the model data is obtained by the battery swapping station.

In the replacement battery, the power management circuit may be further configured to output the voltage to the external electronic device based on the required voltage data through the output terminal when an electric connection between the external electronic device and the replacement battery is identified through the output terminal.

The replacement battery may further include a second output terminal configured to output the voltage converted by the power management circuit to a second external electronic device, in which the power management circuit is further configured to convert the power stored in the battery unit into the voltage based on a voltage corresponding to the second output terminal and output the voltage based on the voltage corresponding to the second output terminal to the second external electronic device through the second output terminal.

In the replacement battery, the power management circuit may be further configured to convert the power stored in the battery unit into the voltage based on the voltage corresponding to the second output terminal when an electric connection between the second external electronic device and the replacement battery is identified through the second output terminal.

In the replacement battery, the power management circuit may include at least one of a direct current (DC)-DC converter or a DC-alternating current (AC) inverter.

Another aspect of the disclosure provides for a method for powering a replacement battery, the method comprising: obtaining required voltage data of an external electronic device from a battery swapping station into which the replacement battery is configured to be inserted, wherein the required voltage data is an indication of a required voltage for operation of the external electronic device based on model data of the external electronic device; converting power stored in a battery unit of the replacement battery into the required voltage for operation of the external electronic device based on the required voltage data; and outputting the voltage to the external electronic device based on the required voltage data through an output terminal of the replacement battery, wherein the replacement battery receives the model data from the battery swapping station.

In the method, outputting the voltage to the external electronic device based on the required voltage data may include outputting the voltage based on the required voltage data to the external electronic device when an electric connection between the external electronic device and the replacement battery is identified.

The method further comprises converting the power stored in the battery unit into the voltage based on a voltage corresponding to a second output terminal of the replacement battery and outputting the voltage based on the voltage corresponding to the second output terminal to the a second external electronic device through the second output terminal.

In the method, converting the power stored in the battery unit into the voltage based on a voltage corresponding to the second output terminal of the replacement battery may include converting the power stored in the battery unit into the voltage based on the voltage corresponding to the second output terminal when an electric connection between the second external electronic device and the replacement battery is identified through the second output terminal.

Another aspect of the disclosure provides for a system comprising: the replacement battery of claim 1; and the battery swapping station.

In the system, the battery swapping station comprises a plurality of slots configured to store at least one replacement battery, wherein the battery swapping station supplies power to each slot.

In the system, the battery swapping station is configured to: obtain model data from an external electronic device; and generate, based on the model data, required voltage data for operation of the external electronic device.

In the system, the battery swapping station is configured to transmit the required voltage data for operation of the external electronic device to the replacement battery.

Advantageous Effects

The replacement battery and the operating method thereof according to various embodiments disclosed herein may output required power based on model data of an electric-powered vehicle of a user, thereby allowing the user to more conveniently use the battery swapping system.

In the replacement battery and the operating method thereof according to various embodiments disclosed herein, the replacement battery disposed in the battery swapping station may serve as the mobile power bank as well as the battery replaceable in the electric-powered vehicle.

The effects of the replacement battery and the operating method thereof according to the disclosure of the present document are not limited to the effects mentioned above, and other effects not mentioned will be clearly understood by those of ordinary skill in the art according to the disclosure of the present document.

Moreover, various effects recognized directly or indirectly from the disclosure may be provided.

DETAILED DESCRIPTION

Figure 1:
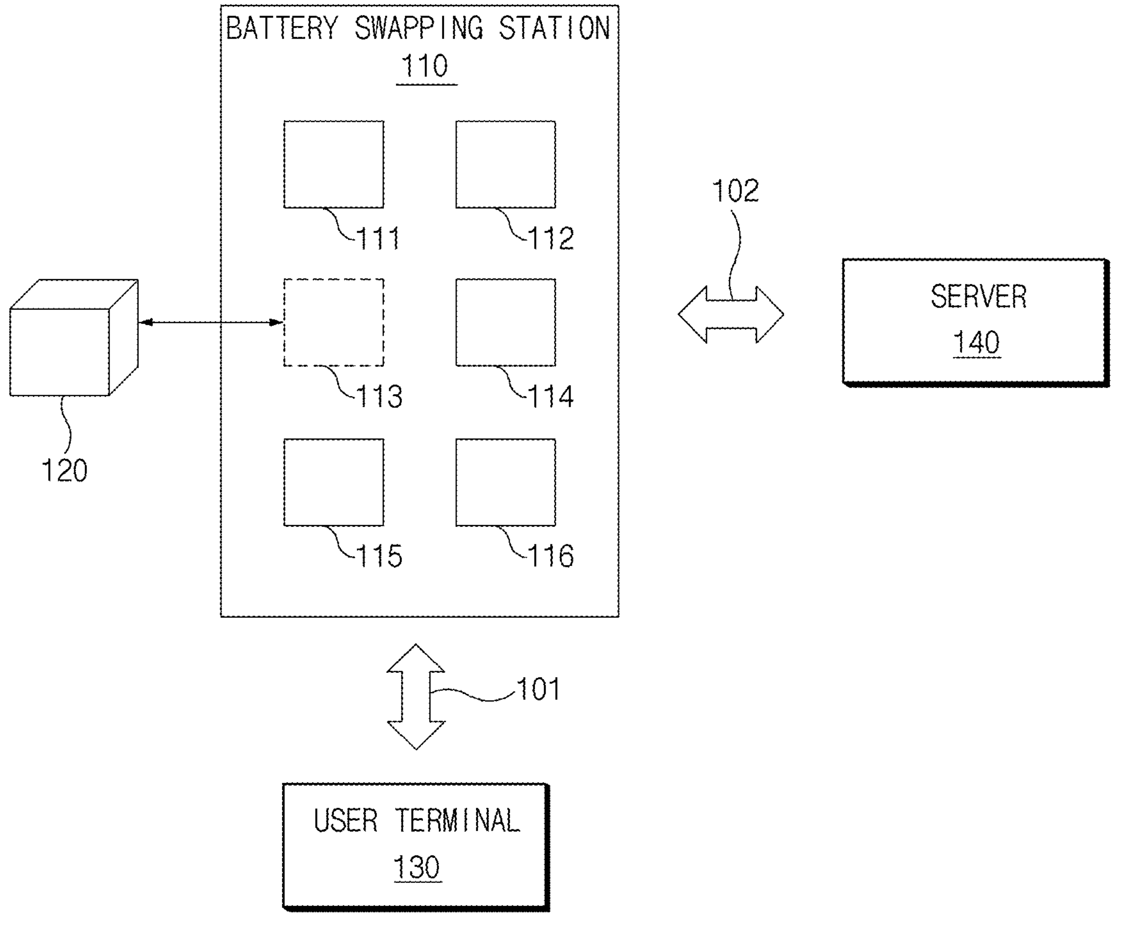
FIG. 1 illustrates a battery swapping system according to an embodiment.

Hereinafter, various embodiments of the present disclosure will be disclosed with reference to the accompanying drawings. However, the description is not intended to limit the present disclosure to particular embodiments, and it should be construed as including various modifications, equivalents, and/or alternatives according to the embodiments of the present disclosure.

It should be appreciated that various embodiments of the present document and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. Such terms as "1$^{st}$", "2$^{nd}$," "first", "second", "A", "B", "(a)", or "(b)" may be used to simply distinguish a corresponding component from another, and does not limit the components in other aspect (e.g., importance or order), unless mentioned otherwise.

Herein, it is to be understood that when an element (e.g., a first element) is referred to, with or without the term "operatively" or "communicatively", as "connected with", "coupled with", or "linked with", or "coupled to" or "connected to" to another element (e.g., a second element), it means that the element may be connected with the other element directly (e.g., wired), wirelessly, or via a third element.

A method according to various embodiments disclosed herein may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store, or between two user devices directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 illustrates a battery swapping system according to an embodiment.

Referring to FIG. 1, a battery swapping system may include a battery swapping station 110, a replacement battery 120, a user terminal 130, and/or a server 140.

The battery swapping station 110 may be provided for each designated charging station. The battery swapping station 110 may include a plurality of slots 111, 112, 113, 114, 115, and 116 capable of accommodating the replacement battery 120 to charge the same. When the replacement battery 120 is disposed in one of the plurality of slots 111, 112, 113, 114, 115, and 116, the battery swapping station 110 may supply power to the replacement battery 120.

The battery swapping station 110 may receive the replacement battery 120 used by the user of the electric-powered vehicle (e.g., the electric vehicle, the electric scooter, the electric bicycle, etc.) and provide a fully charged replacement battery to the user when the user pays a charging fee. For example, when the user returns the replacement battery 120 used by the user to the slot 113 of the battery swapping station 110, the replacement battery 120 may be mounted on the slot 113. Thereafter, when the user pays the charging fee, another replacement battery in one of the other slots 111, 112, 114, 115, and 116 may be separated from the slot and provided to the user.

The replacement battery 120 may be a battery pack mounted on an electric-driven vehicle for use. The replacement battery 120 may be separated from the electric-powered vehicle and disposed in one of the plurality of slots 111, 112, 113, 114, 115, and 116 of the battery swapping station 110. The replacement battery 120 disposed in one of the plurality of slots 111, 112, 113, 114, 115, and 116 may be supplied with power from the battery swapping station 110.

The battery swapping station 110 may be wired and/or wirelessly connected to the user terminal 130 and/or the server 140.

Connection 101 and/or 102 between the battery swapping station 110 and the user terminal 130 and/or the server 140 may be communication connection through a wired and/or wireless network. The wired network may be based on a local area network (LAN) communication or a power-line communication. The wireless network may be based on a short-range communication network (e.g., Bluetooth, Wireless Fidelity (WiFi), or Infrared Data Association (IrDA)) or a remote-range communication network (e.g., a cellular network, a $4^{th}$-Generation (4G) network, a $5^{th}$-Generation (5G) network).

The battery swapping station 110 may obtain model data of an external electronic device from the user terminal 130 through the connection 101 with the user terminal 130. Herein, the external electronic device may be an electric-powered vehicle on which the replacement battery 120 provided by the battery swapping station 110 is to be mounted.

The battery swapping station 110 may obtain information (e.g., a manufacturing date, a manufacturer, a required voltage, etc.) corresponding to the model data from the server 140 through the connection 102 with the server 140. The battery swapping station 110, when obtaining the model data from the user terminal 130, may request the information corresponding to the model data from the server 140 through the connection 102 with the server 140. The battery swapping station 110 may obtain the information transmitted from the server 140 through the connection 102 with the server 140 in response to the request.

The battery swapping station 110 may generate required voltage data of the external electronic device based on the model data obtained from the user terminal 130. For example, the battery swapping station 110 may generate the required voltage data based on information corresponding to the model data (e.g., the required voltage), previously stored in a memory.

The battery swapping station 110 may generate the required voltage data of the external electronic device based on the model data of the external electronic device, obtained from the user terminal 130, and the information corresponding to the model data, obtained from the server 140.

The battery swapping station 110 may transmit the generated required voltage data to the replacement battery 120 disposed in one of the plurality of slots 111, 112, 113, 114, 115, and 116.

Figure 2:
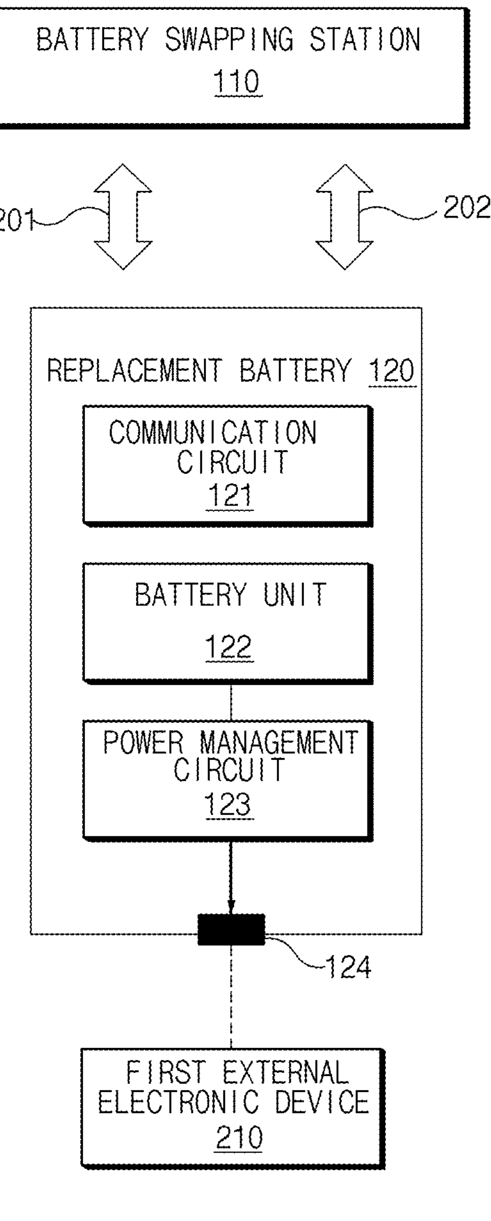
FIG. 2 is a block diagram of a replacement battery according to an embodiment.

FIG. 2 is a block diagram of a replacement battery according to an embodiment. The battery swapping station 110 and the replacement battery 120 shown in FIGS. 1 and 2 may have the same configuration.

Referring to FIG. 2, the replacement battery 120 may include a communication circuit 121, a battery unit 122, a power management circuit 123, and a first output terminal 124.

The communication circuit 121 may transmit and receive data through the connection 201 between the replacement battery 120 and the battery swapping station 110. The connection 201 between the replacement battery 120 and the battery swapping station 110 may be communication connection through a wired and/or wireless network.

The communication circuit 121 may obtain required voltage data of the first external electronic device 210 from the battery swapping station 110. The first external electronic device 210 may be an electric-powered vehicle (e.g., an electric vehicle, an electric scooter, an electric bicycle, etc.).

The required voltage data may be data generated based on the model data of the first external electronic device 210, obtained from the user terminal (e.g., the user terminal 130 of FIG. 1) by the battery swapping station 110. According to another embodiment, the required voltage data may be data generated by the battery swapping station 110 based on the model data and the information corresponding to the model data, obtained from the server (e.g., the server 140 of FIG. 1).

The battery unit 122 may be a battery cell or a battery module that supplies power or is supplied with power.

The battery unit 122 may be electrically connected to the power management circuit 123. The battery unit 122 may receive or transfer power from or to the power management circuit 123.

The power management circuit 123 may manage power received from the battery swapping station 110 through the connection 202 between the replacement battery 120 and the battery swapping station 110. The connection 202 between the replacement battery 120 and the battery swapping station 110 may be formed when the replacement battery 120 is mounted in a slot (e.g., the slot 113 of FIG. 1) of the battery swapping station 110. The power management circuit 123 may convert the power received from the battery swapping station 110 into a designated voltage or current. The power management circuit 123 may transfer power based on the converted voltage and current to the battery unit 122.

The power management circuit 123 may manage power to be output to the first external electronic device 210 through the first output terminal 124. The power management circuit 123 and the first external electronic device 210 may be connected through the first output terminal 124 when the replacement battery 120 is separated from a slot (e.g., the slot 113 of FIG. 1) of the battery swapping station 110 and is coupled to the first external electronic device 210. The power management circuit 123 may convert the power stored in the battery unit 122 into designated voltage or current. The power management circuit 123 may output the power based on the converted voltage and current to the first external electronic device 210 through the first output terminal 124.

The power management circuit 123 may convert the power stored in the battery unit 122 into power based on the required voltage data of the first external electronic device 210. For example, the power management circuit 123 may convert a voltage of the power stored in the battery unit 122 into a required voltage of the first external electronic device 210.

The power management circuit 123 may output the power converted based on the required voltage data to the first external electronic device 210 through the first output terminal 124.

The power management circuit 123 may identify an electric connection between the first external electronic device 210 and the replacement battery 120. In an embodiment, the power management circuit 123 may identify the electric connection between the first external electronic device 210 and the replacement battery 120 through the first output terminal 124.

When the electric connection between the first external electronic device 210 and the replacement battery 120 is identified, the power management circuit 123 may output the power converted based on the required voltage data to the first external electronic device 210 through the first output terminal 124.

The power management circuit 123 may include at least one of a direct current (DC)-DC converter capable of converting a DC voltage into DC voltage or a DC-alternating current (AC) inverter capable of converting DC voltage into AC voltage.

Hereinbelow, the replacement battery 120 serving also as a mobile power bank will be described with reference to FIG. 3.

Figure 3:
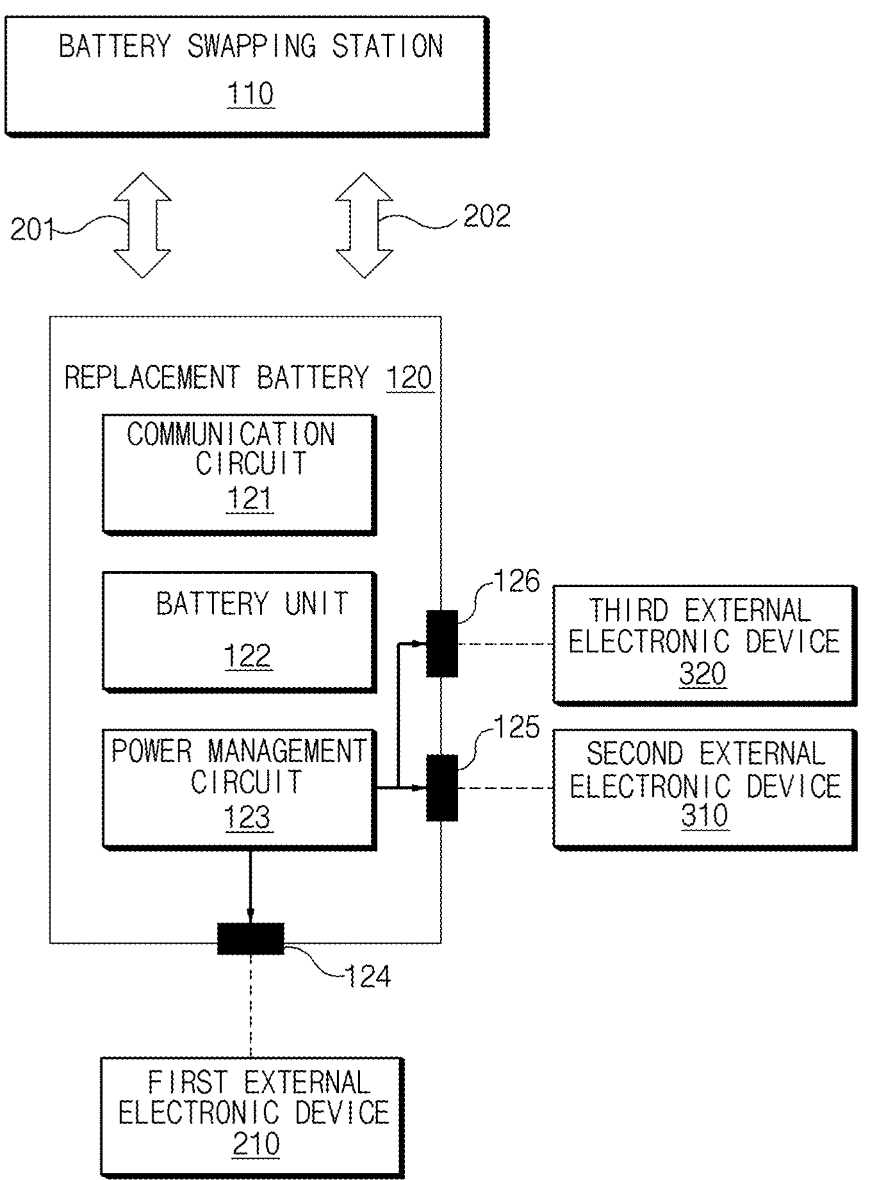
FIG. 3 is a block diagram of a replacement battery according to an embodiment.

FIG. 3 is a block diagram of a replacement battery according to an embodiment. The battery swapping station 110 and the replacement battery 120 shown in FIGS. 1 and 3 may have the same configuration.

Herein, the same components (e.g., the connections 201 and 202, the communication circuit 121, the battery unit 122, the power management circuit 123, and the first output terminal 124) as the components shown in FIG. 2 will not be repeatedly described.

The power management circuit 123 may manage power to be output to the second external electronic device 310 (or a third external electronic device 320) through the second output terminal 125 (or a third output terminal 126). Herein, the second external electronic device 310 (or the third external electronic device 320) may be various electronic devices electrically connected to the replacement battery 120 used as the mobile power bank through the second output terminal 125 (or the third output terminal 126) to receive power from the replacement battery 120. The power management circuit 123 may convert the power stored in the battery unit 122 into a voltage and/or current corresponding to the second output terminal 125 (or the third output terminal 126).

The power management circuit 123 may output power based on the converted voltage and/or current to the second external electronic device 310 (or the third external electronic device 320) through the second output terminal 125 (or the third output terminal 126).

The power management circuit 123 may identify an electric connection between the second external electronic device 310 (or the third external electronic device 320) and the replacement battery 120. In an embodiment, the power management circuit 123 may identify an electric connection between the second external electronic device 310 (or the third external electronic device 320) and the replacement battery 120 through the second output terminal 125 (or the third output terminal 126).

When the electric connection between the second external electronic device 310 (or the third external electronic device 320) and the replacement battery 120 is identified, the power management circuit 123 may convert the power stored in the battery unit 122 into a voltage corresponding to the second output terminal 125 (or the third output terminal 126).

Figure 4:
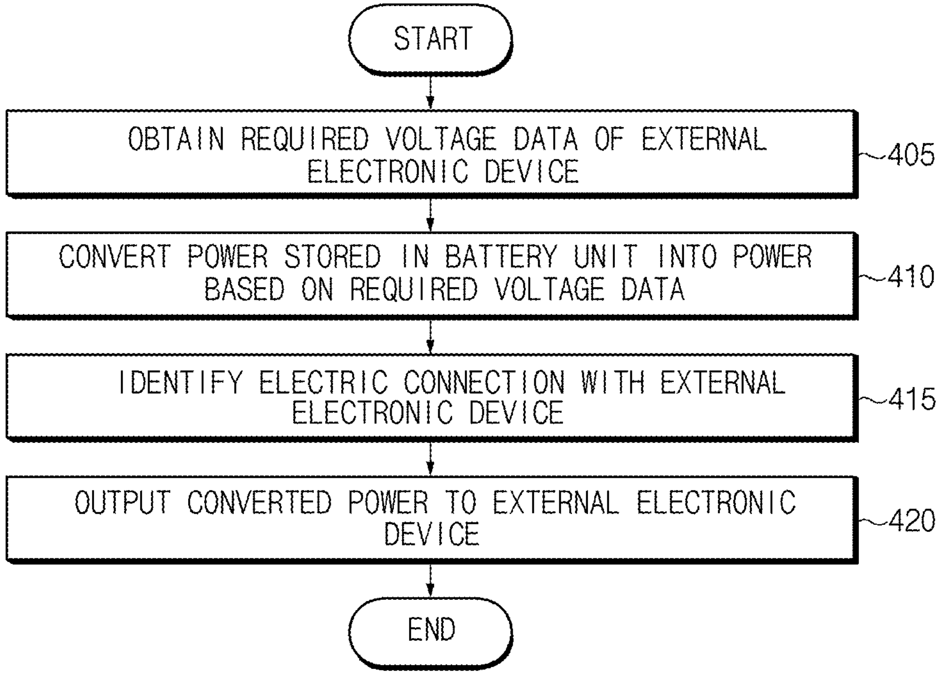
FIG. 4 is a flowchart of a replacement battery according to an embodiment.

FIG. 4 is a flowchart of a replacement battery according to an embodiment. FIG. 4 will be described using the components of FIGS. 1, 2, and 3.

The embodiment shown in FIG. 4 may be an example, and an order of operations according to various embodiments of the present disclosure may be different from that shown in FIG. 4, and some operations shown in FIG. 4 may be omitted, the order of the operations may be changed, or the operations may be merged. For example, operation 415 may be omitted. In another example, orders of operations 410 and 415 may be changed.

Referring to FIG. 4, in operation 405, the replacement battery 120 may obtain required voltage data of an external electronic device (e.g., the first external electronic device 210 of FIG. 2).

The required voltage data may be data generated based on the model data of the external electronic device, obtained from the user terminal (e.g., the user terminal 130 of FIG. 1) by the battery swapping station 110. The required voltage data may be data generated by the battery swapping station 110 based on the model data and the information corresponding to the model data, obtained from the server (e.g., the server 140 of FIG. 1).

In operation 410, the replacement battery 120 may convert the power stored in the battery unit 122 into power based on the required voltage data obtained in operation 405. For example, the replacement battery 120 may convert a voltage of the power stored in the battery unit 122 into a required voltage of the external electronic device.

In operation 415, the replacement battery 120 may identify an electric connection between an external electronic device and the replacement battery 120. In an embodiment, the replacement battery 120 may identify an electric connection between the external electronic device and the replacement battery 120 through the first output terminal 124.

In operation 420, the replacement battery 120 may output the power converted in operation 410 to the external electronic device. The replacement battery 120 may output the power converted in operation 410 to the external electronic device through the first output terminal 124.

Figure 5:
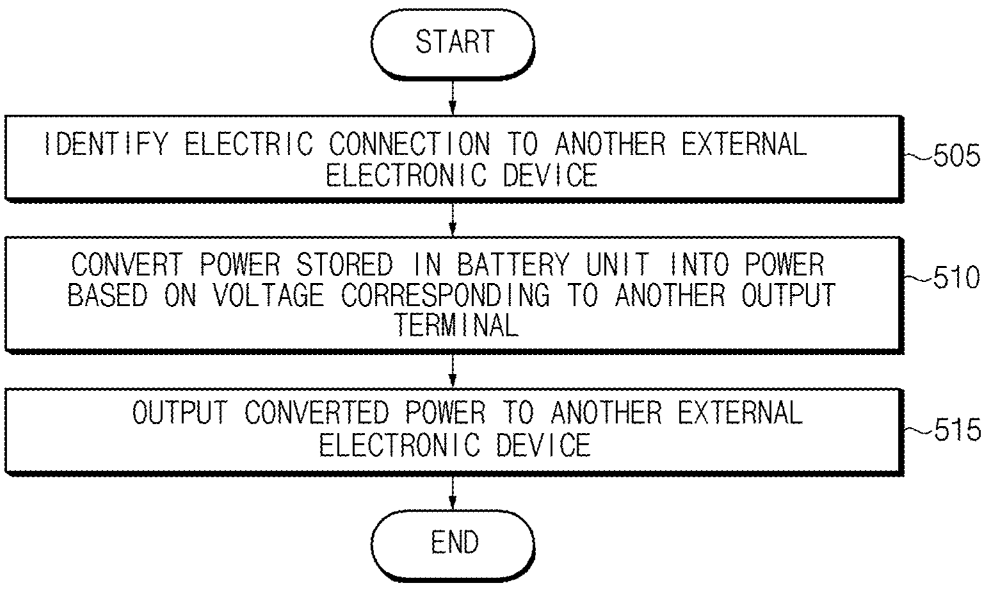
FIG. 5 is a flowchart of a replacement battery according to an embodiment.

FIG. 5 is a flowchart of a replacement battery according to an embodiment. FIG. 5 will be described using the components of FIGS. 1, 2, and 3.

The embodiment shown in FIG. 5 may be an example, and an order of operations according to various embodiments of the present disclosure may be different from that shown in FIG. 5, and some operations shown in FIG. 5 may be omitted, the order of the operations may be changed, or the operations may be merged.

Referring to FIG. 5, in operation 505, the replacement battery 120 may identify the electric connection between another external electronic device (e.g., the second external electronic device 310 and/or the third external electronic device 320 of FIG. 3) and the replacement battery 120. The replacement battery 120 may identify the electric connection between the other external electronic device and the replacement battery 120 through another output terminal (e.g., the second output terminal 125 and/or the third output terminal 126 of FIG. 3).

In operation 510, the replacement battery 120 may convert the power stored in the battery unit 122 into power based on a voltage corresponding to the other output terminal. Herein, the other output terminal may mean an output terminal that electrically connects the other external electronic device to the replacement battery 120.

In operation 515, the replacement battery 120 may output the power converted in operation 510 to the other external electronic device. The replacement battery 120 may output the power converted in operation 510 to the other external electronic device through the other output terminal.

Terms such as "include", "constitute" or "have" described above may mean that the corresponding component may be inherent unless otherwise stated, and thus should be construed as further including other components rather than excluding other components. All terms including technical or scientific terms have the same meanings as those generally understood by those of ordinary skill in the art to which the embodiments disclosed herein pertain, unless defined otherwise. The terms used generally, like terms defined in dictionaries, should be interpreted as having meanings that are the same as the contextual meanings of the relevant technology and should not be interpreted as having ideal or excessively formal meanings unless they are clearly defined in the present document.

The invention claimed is:

1. A replacement battery comprising:

a battery unit;

a communication circuit configured to obtain required voltage data of an external electronic device from a battery swapping station into which the replacement battery is configured to be inserted, wherein the required voltage data is an indication of a required voltage for operation of the external electronic device based on model data of the external electronic device;

a power management circuit configured to convert power stored in the battery unit into the required voltage for operation of the external electronic device based on the required voltage data; and an output terminal configured to output the voltage to the external electronic device based on the required voltage data, wherein the model data is obtained by the battery swapping station.

2. The replacement battery of claim 1, wherein the power management circuit is further configured to output the voltage to the external electronic device based on the required voltage data through the output terminal, when an electric connection between the external electronic device and the replacement battery is identified through the output terminal.

3. The replacement battery of claim 1, further comprising a second output terminal configured to output the voltage converted by the power management circuit to a second external electronic device, wherein the power management circuit is further configured to:

convert the power stored in the battery unit into the voltage based on a voltage corresponding to the second output terminal; and output the voltage, based on the voltage corresponding to the second output terminal, to the second external electronic device through the second output terminal.

4. The replacement battery of claim 3, wherein the power management circuit is further configured to convert the power stored in the battery unit into the voltage based on the voltage corresponding to the second output terminal, when an electric connection between the second external electronic device and the replacement battery is identified through the second output terminal.

5. The replacement battery of claim 1, wherein the power management circuit comprises at least one of a direct current (DC)-DC converter or a DC-alternating current (AC) inverter.

6. A method for powering a replacement battery, the method comprising:

obtaining required voltage data of an external electronic device from a battery swapping station into which the replacement battery is configured to be inserted, wherein the required voltage data is an indication of a required voltage for operation of the external electronic device based on model data of the external electronic device;

converting power stored in a battery unit of the replacement battery into the required voltage for operation of the external electronic device based on the required voltage data; and outputting the voltage to the external electronic device based on the required voltage data through an output terminal of the replacement battery, wherein the replacement battery receives the model data from the battery swapping station.

7. The method of claim 6, wherein outputting the voltage to the external electronic device based on the required voltage data comprises outputting the voltage based on the required voltage data when an electric connection between the external electronic device and the replacement battery is identified.

8. The method of claim 6, further comprising:

converting the power stored in the battery unit into the voltage based on a voltage corresponding to a second output terminal of the replacement battery; and outputting the voltage based on the voltage corresponding to the second output terminal to a second external electronic device through the second output terminal.

9. The method of claim 8, wherein converting the power stored in the battery unit into the voltage based on the voltage corresponding to the second output terminal of the replacement battery comprises converting the power stored in the battery unit into the voltage based on the voltage corresponding to the second output terminal, when an electric connection between the second external electronic device and the replacement battery is identified through the second output terminal.

10. A system comprising:

the replacement battery of claim 1; and the battery swapping station.

11. The system of claim 10, wherein the battery swapping station comprises a plurality of slots configured to store at least one replacement battery, wherein the battery swapping station supplies power to each slot.

12. The system of claim 10, wherein the battery swapping station is configured to:

obtain model data from an external electronic device; and generate, based on the model data, required voltage data for operation of the external electronic device.

13. The system of claim 10, wherein the battery swapping station is configured to transmit the required voltage data for operation of the external electronic device to the replacement battery.

* * * * *